(12) United States Patent
Kokeguchi et al.

(10) Patent No.: US 7,566,072 B2
(45) Date of Patent: *Jul. 28, 2009

(54) OCCUPANT RESTRAINING APPARATUS

(75) Inventors: Akira Kokeguchi, Tokyo (JP); Atsushi Hiroshige, Toyota (JP)

(73) Assignee: Takata Corporation, Tokyo (JP)

( * ) Notice: Subject to any disclaimer, the term of this patent is extended or adjusted under 35 U.S.C. 154(b) by 387 days.

This patent is subject to a terminal disclaimer.

(21) Appl. No.: 11/526,007

(22) Filed: Sep. 25, 2006

(65) Prior Publication Data

US 2007/0069508 A1  Mar. 29, 2007

(30) Foreign Application Priority Data

Sep. 26, 2005 (JP) .............................. 2005-278164

(51) Int. Cl.
*B60R 21/18* (2006.01)

(52) U.S. Cl. ..................................... 280/733; 280/801.1

(58) Field of Classification Search ................. 280/733, 280/728.2, 730.1, 801.1, 801.2
See application file for complete search history.

(56) References Cited

U.S. PATENT DOCUMENTS 5,829,841 A  11/1998  Pywell et al.
6,547,273 B2 *  4/2003  Grace et al. .................. 280/733
2007/0069510 A1 *  3/2007  Suyama et al. ............... 280/733
2007/0182136 A1 *  8/2007  Nezaki et al. ................ 280/733

FOREIGN PATENT DOCUMENTS

| DE | 199 50 951 | 4/2001 |
| JP | 2001-239906 | 9/2001 |
| JP | 2003-312439 | 11/2003 |
| WO | WO 98/00314 | 1/1998 |

* cited by examiner

*Primary Examiner*—John Q. Nguyen
*Assistant Examiner*—Nicole Verley
(74) *Attorney, Agent, or Firm*—Foley & Lardner LLP

(57) ABSTRACT

An occupant restraining apparatus includes a seat belt with an inflatable portion that can be placed at a high position on a lateral side of an occupant's head without using a large-capacity inflator. A push-up device with first and second levers for pushing up a shoulder belt section is provided on an upper side of a seatback. When the shoulder belt section is inflated, upper arm portions arranged on an upper side of the shoulder belt section are pressed upward, and the respective levers rotate upward about pivotably supporting portions. At this time, lower arm portions of the respective levers arranged on a lower side of the shoulder belt section rise and rotate, and a hanging member is tensed between the lower arm portions. Consequently, the inflated shoulder belt section is pushed upward, and is placed at a high position on the lateral side of the occupant's head.

24 Claims, 4 Drawing Sheets

OCCUPANT RESTRAINING APPARATUS

BACKGROUND

The present application relates to a passenger restraining apparatus for restraining an occupant seated on a vehicle seat with an inflatable belt.

A passenger restraining apparatus for restraining a passenger seated on a vehicle seat with an inflatable belt, a passenger restraining apparatus having a shoulder anchor arranged on a rear side of the seat with respect to the vehicle, and a passenger restraining belt to be passed through the shoulder anchor and pulled around a front side of the passenger, in which at least a portion of the passenger restraining belt which is arranged on a lateral side of the passenger's head is an inflatable portion is known (for example, Japanese Unexamined Patent Application Publication No. 2003-312439 ("JP Pub. No. '439"), which is incorporated by reference herein in its entirety).

The passenger restraining apparatus (air belt apparatus) in JP Pub. No. '439 described above includes a shoulder anchor mounted to an upper portion of a pillar member placed on the obliquely rear side of the vehicle seat, so that a passenger restraining belt passed through the shoulder anchor is pulled around the front side of the passenger seated on the seat.

The passenger restraining belt includes a shoulder belt section which is drawn obliquely from the shoulder anchor via the lateral side of the passenger's head and the front side of an upper body of the passenger to a portion near a lumbar part on the other side of the shoulder anchor, and a lap belt section which is continued from a lower end of the shoulder belt section and drawn along the lateral direction so as to cover around an abdominal portion of the passenger. In JP Pub. No. '439, the shoulder belt section is configured with an inflatable bag-shaped belt. The bag-shaped belt is arranged so that an upper end side thereof is positioned on the lateral side of the passenger's head. In JP Pub. No. '439, the lap belt section is also configured with the inflatable bag-shaped belt.

When the vehicle collides, falls on its side, and so on, the shoulder belt section and the lap belt section are inflated to restrain the passenger. At this time, the upper end side of the shoulder belt section is inflated on the lateral side of the passenger's head, that is, between the passenger's head and a side surface of a vehicle cabin. Accordingly, the passenger's head is prevented from hitting directly onto the side surface of the cabin or the like.

The inflatable portion of the above-described shoulder belt section or the like is preferably inflated to a position as high as possible and arranged on the lateral side of the center of gravity of the passenger's head or in the vicinity thereof as well.

In order to do so, it is conceivable that the inflatable portion of a large capacity is employed. However, in this case, a high-output inflator may be required.

SUMMARY

An embodiment of an occupant restraint device includes a restraint belt and a push up device. The restraint belt includes an inflatable portion arranged on a lateral side of an occupant's head; and the push up device is configured to push up the inflatable portion that is located on an upper surface of a seatback. When the inflatable portion inflates, an upper side of the inflatable portion pushes up and rotates the push up device such that the push up device then pushes up a lower side of the inflatable portion.

According to another embodiment, an occupant restraining apparatus is provided. The device includes an occupant restraining belt to be pulled around a front side of an occupant by a lateral side of the occupant's head and including an inflatable portion at least at a portion arranged on the lateral side of the occupant's head; and a push-up device for pushing up the inflatable portion, the push-up device being provided on an upper surface portion of a seatback. The push-up device includes: a first lever having an upper arm portion and a lower arm portion arranged respectively on an upper side and a lower side on one half side in the direction of the width of the belt and a connecting portion connecting the upper arm portion and the lower arm portion and arranged on a lateral side of the one half side of the belt, a second lever having an upper arm portion and a lower arm portion arranged respectively on an upper side and a lower side on the other half side in the direction of the width of the belt and a connecting portion connecting the upper arm portion and the lower arm portion and arranged on a lateral side of the other half side of the belt, a first pivotably supporting portion for rotatably supporting the connecting portion of the first lever to an upper portion of the seatback, a second pivotably supporting portion for rotatably supporting the connecting portion of the second lever to the upper portion of the seatback, and a hanging member hung across the lower arm portion of the first lever and the lower arm portion of the second lever for being tensed between the lower arm portions and pushing up the belt when the respective levers rotate and the respective lower arm portions rise upward with respect to the respective pivotably supporting portions.

It is to be understood that both the foregoing general description and the following detailed description are exemplary and explanatory only, and are not restrictive of the invention as claimed.

DETAILED DESCRIPTION

Figure 1:
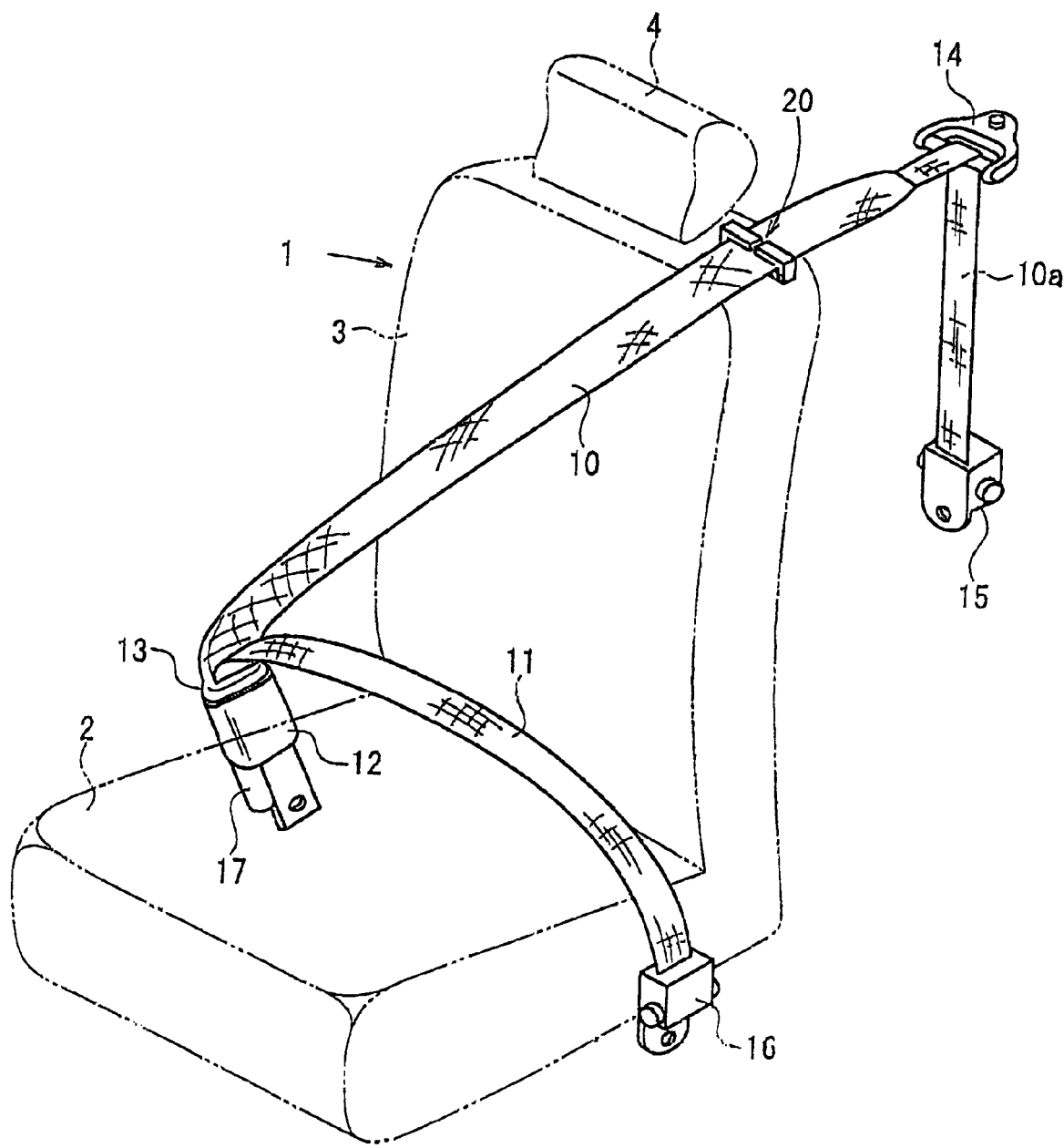
FIG. 1 is a perspective view of a passenger restraining apparatus according to an embodiment.

A disclosed embodiment is directed to a passenger restraining apparatus in which an inflated inflatable portion can be arranged at a high position of the lateral side of the passenger's head without using a high-output inflator.

A passenger restraining apparatus according to a disclosed embodiment o is a passenger restraining apparatus including a passenger restraining belt to be pulled around a front side of a passenger by a lateral side of the passenger's head and having an inflatable portion at least at a portion arranged on the lateral side of the passenger's head, characterized in that a push-up device for pushing up the inflatable portion is provided on an upper surface portion of a seatback, and the push-up device includes: a first lever having an upper arm portion and a lower arm portion arranged respectively on an upper side and a lower side on one half side in the direction of the width of the belt and a connecting portion connecting the upper arm portion and the lower arm portion and arranged on the lateral side of the one half side of the belt, a second lever having an upper arm portion and a lower arm portion arranged respectively on an upper side and a lower side on the other half side in the direction of the width of the belt and a connecting portion connecting the upper arm portion and the lower arm portion and arranged on a lateral side of the other half side of the belt, a first pivotably supporting portion for rotatably supporting the connecting portion of the first lever to an upper portion of the seatback, a second pivotably supporting portion for rotatably supporting the connecting portion of the second lever to the upper portion of the seatback, and a hanging member hung across the lower arm portion of the first lever and the lower arm portion of the second lever for being tensed between the lower arm portions and pushing up the belt when the respective levers rotate and the respective lower arm portions rise upward with respect to the respective pivotably supporting portions.

Since the passenger restraining apparatus is provided with the push-up device for pushing up the inflatable portion of the passenger restraining belt on the upper portion of the seatback of the seat, the inflated inflatable portion can be placed at a high position on the lateral side of the passenger's head without using a high-output inflator by pushing up the inflatable portion with the push-up device.

A description of the operation of the push-up device follows. When the inflatable portion is inflated, the respective upper arm portions of the first and second levers arranged respectively on the upper side of the one half side and the other half side in the direction of the width of the belt are pushed up by the inflatable portion, and the first and second levers rotate upward about the respective pivotably supporting portions thereof. In association with the rotation of the first and second levers, the lower arm portions of the respective levers arranged respectively on the lower side of the one half side and the other half side of the belt are rotated and raised, and the hanging member is hung across the lower arm portions. Consequently, the inflated inflatable portion is pushed upward by the lower arm portions and the hanging member and is placed at a high position on the lateral side of the passenger's head.

According to a disclosed embodiment, the inflatable portion is adapted to be pushed up by rotating the respective levers by an inflating pressure of the inflatable portion. As a result, simplification of the configuration or reduction of manufacturing cost can be achieved without necessity of providing a power source for pushing up the inflatable portion separately.

Referring now to the drawings, various embodiments will be described.

Figure 2:
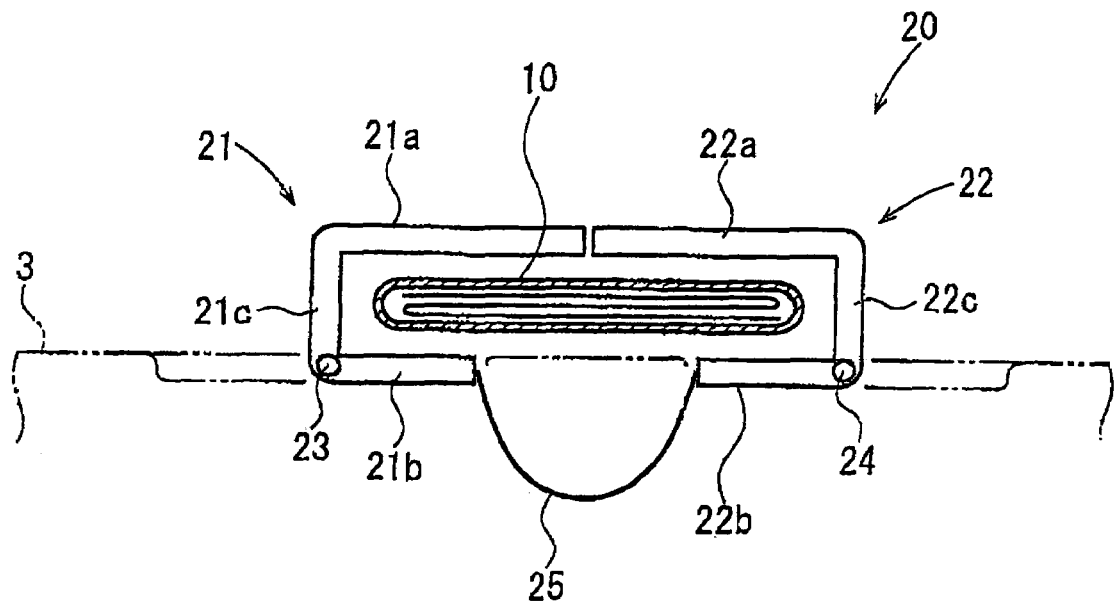
FIG. 2 is a front view of a belt push-up device in the passenger restraining apparatus shown in FIG. 1 before pushing up the belt.
Figure 3:
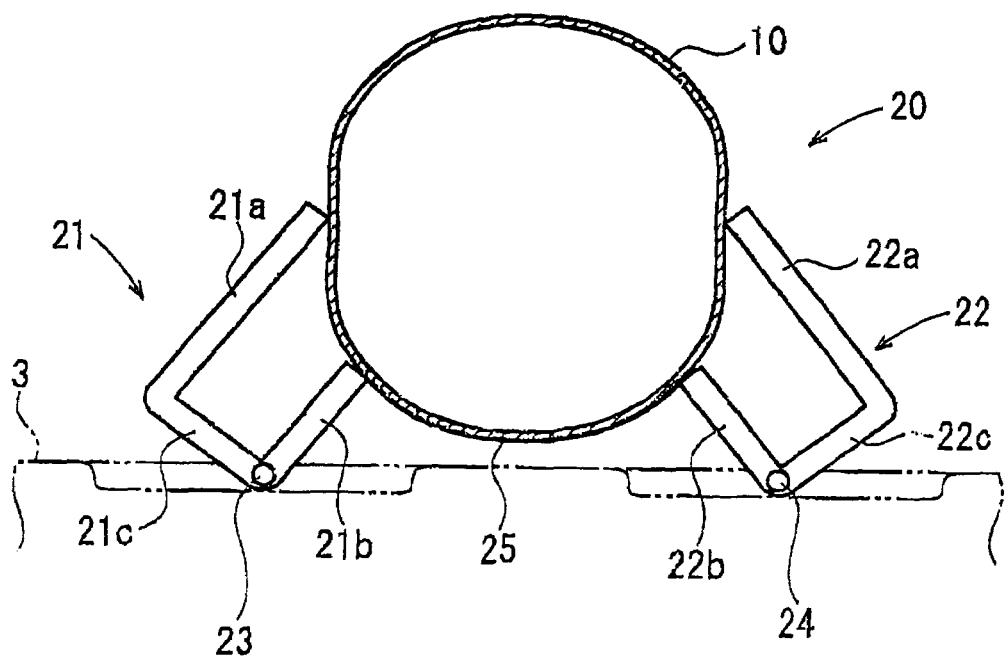
FIG. 3 is a front view of the belt push-up device in the passenger restraining apparatus shown in FIG. 1 when the belt is being pushed upward.
Figure 4:
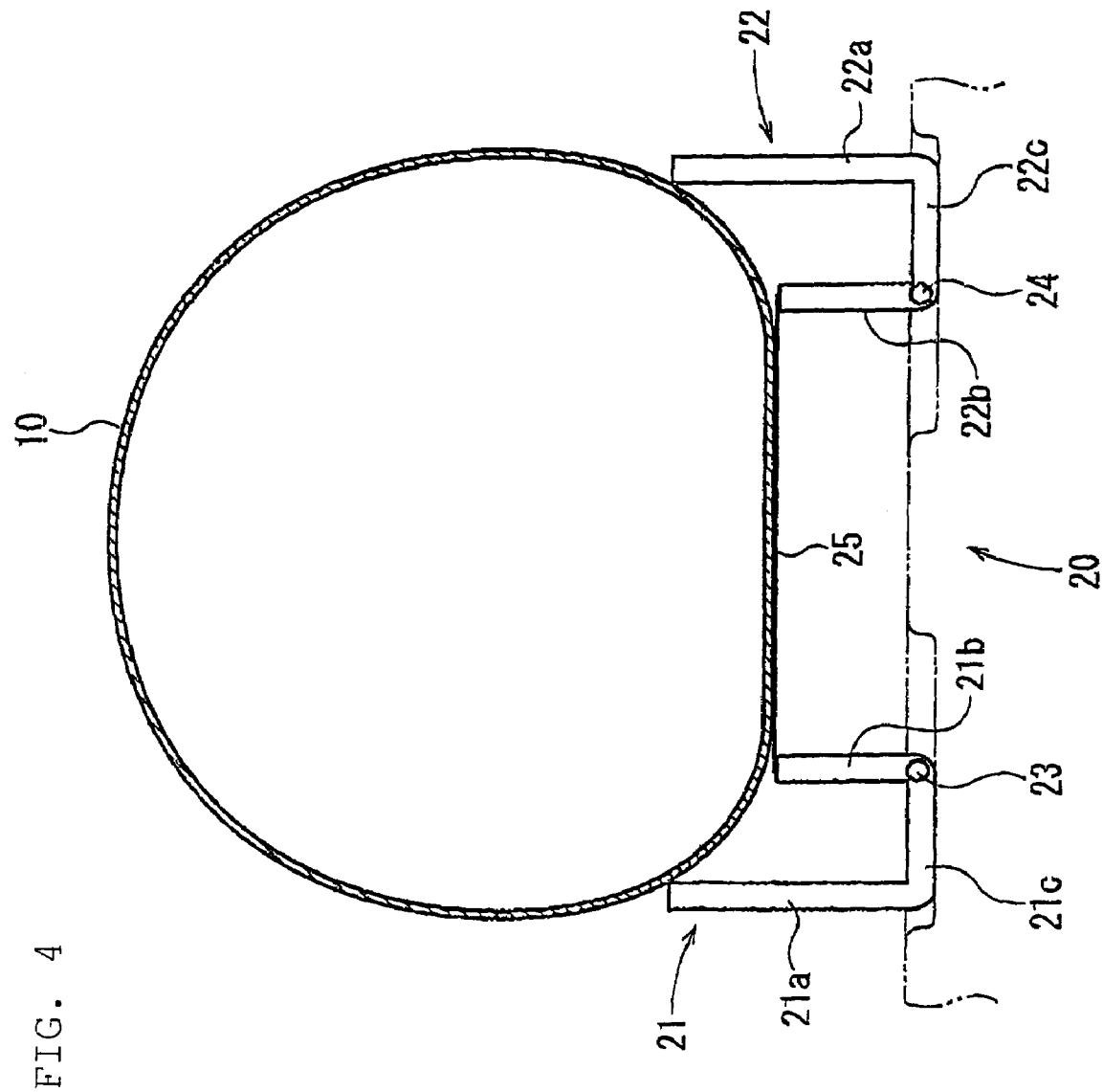
FIG. 4 is a front view of the belt push-up device in the passenger restraining apparatus shown in FIG. 1 after the belt is pushed upward.
Figure 5:
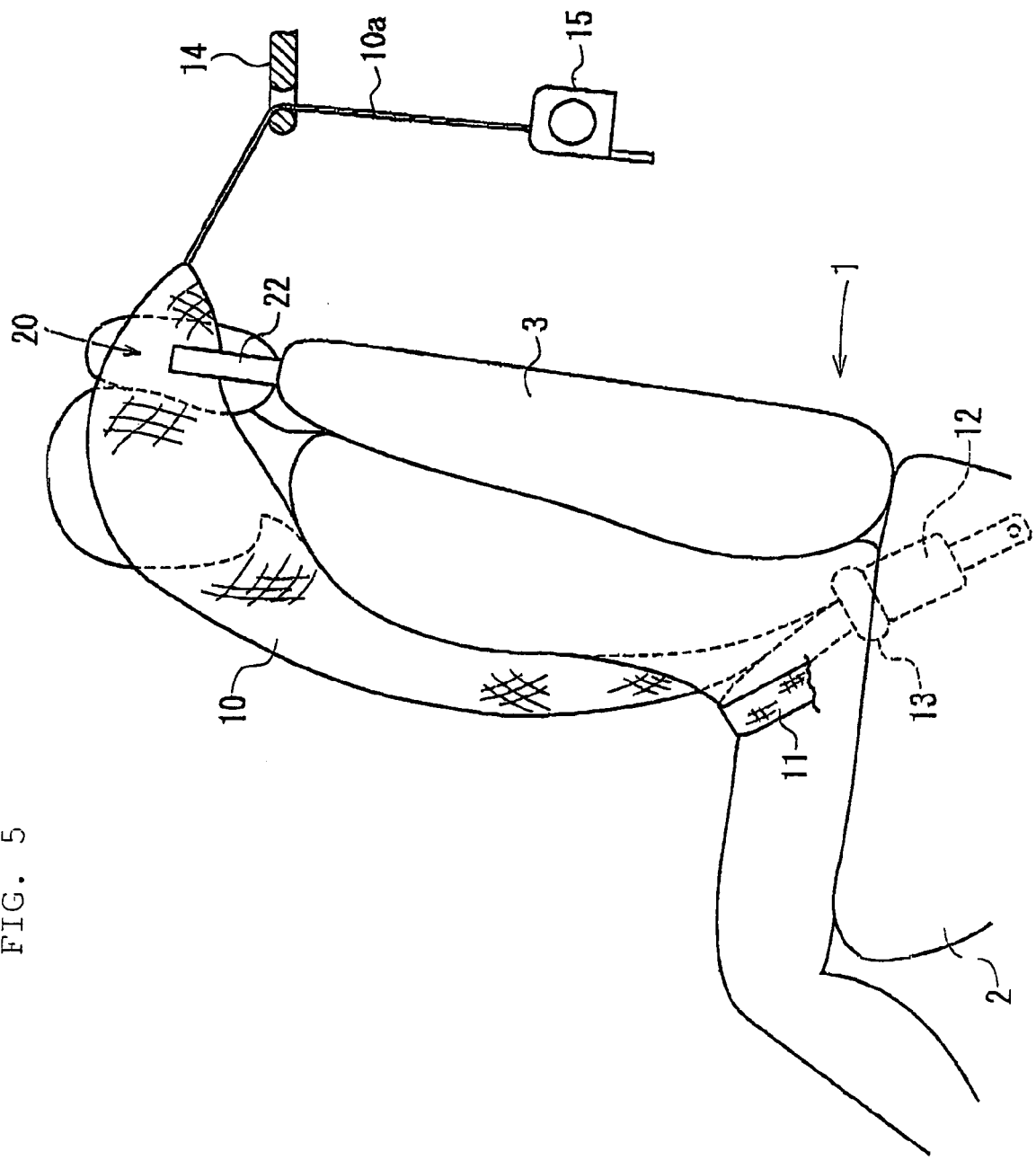
FIG. 5 is a side view of the passenger restraining apparatus shown in FIG. 1.

FIG. 1 is a perspective view of a passenger restraining apparatus according to the embodiment; FIGS. 2 to 4 are front views of a belt push-up device of the passenger restraining apparatus, and FIG. 5 is a side view of the passenger restraining apparatus. FIG. 1 and FIG. 2 show a state before the belt is pushed up; FIG. 3 shows a state in which the belt is being pushed up; and FIG. 4 and FIG. 5 show a state in which the belt is completely pushed up.

A vehicle seat 1 includes a seat cushion 2 on which a passenger is seated, a seatback 3 which constitutes a back of the seat, and a head rest 4 provided on top of the seatback 3.

In this embodiment, the passenger restraining apparatus includes an inflatable shoulder belt section 10 which passes by a lateral side of the passenger's head seated on the seat 1 and drawn obliquely along a front side of an upper body of the passenger (from the upper left to the lower right in this embodiment), a webbing 10a connected to the shoulder belt section 10, a lap belt section 11 drawn in the lateral direction on an upper side of a lumbar part of the passenger, a buckle device 12 installed on a lateral side (the right side in this embodiment) of the seat 1, a tongue 13 inserted into the engaged with the buckle device 12 when attaching the belt, a shoulder anchor 14 for guiding the webbing 10a, a push-up device 20 for pushing up the shoulder belt section 10 provided on an upper surface portion of the seatback 3 (un upper surface of the left shoulder portion of the seatback 3 in this embodiment), and so on.

In this embodiment, the shoulder belt section 10, the webbing 10a and the lap belt section 11 constitute a passenger restraining belt, and the shoulder belt section 10 forms an inflatable portion. The shoulder belt section 10 inflates from the lateral side of the head to the front side of the upper body of the passenger.

The shoulder belt section 10 is formed by folding a wide belt-shaped bag into a narrow band shape and covering the same with a cover, and is held in a band shape in the normal state. A distal end of the webbing 10a is connected to an upper end side of the shoulder belt section 10 by sewing or the like, and the tongue 13 is joined to a lower end side of the shoulder belt section 10.

The webbing 10a is formed of a conventional belt similar to a general non-inflatable seatbelt in the related art, and is slidably guided and passed through the shoulder anchor 14. An end of the webbing 10a is retractably joined to a seatbelt retractor (ELR) 15 with an emergency locking mechanism installed on the vehicle.

In this embodiment, the lap belt section 11 is also formed of a non-inflatable normal belt, and is retractably joined at one end with the tongue 13 and at the other end with a seatbelt retractor (ELR) 16 installed on the seat 1 on the opposite side from the buckle device 12.

In this embodiment, an inflator 17, which is activated when urgently necessary such as a vehicle collision or the like, to generate high-pressure gas is connected to the buckle device 12, and a duct (not shown) for guiding the gas from the inflator 17 into the shoulder belt section 10 (in the bag) is provided on the tongue 13.

The push-up device 20 includes first and second levers 21, 22 provided respectively on one half side and the other half side in the direction of the width of the shoulder belt section 10 and each formed substantially into an angular C-shape, first and second pivotably supporting portions 23, 24 for supporting the first and second levers 21, 22 rotatably with respect to the upper surface of the left shoulder portion of the seatback 3 respectively, and a hanging member 25 hung across the first and second levers 21, 22 (between lower arm portions 21b, 22b described later) on a lower side of the shoulder belt section 10.

The first lever 21 includes an upper arm portion 21a and a lower arm portion 21b arranged respectively on an upper side and a lower side on the one half side in the direction of the width of the shoulder belt section 10, and extending in the direction of the width of the shoulder belt section 10, and a connecting portion 21c arranged on a lateral side on the one half side of the shoulder belt section 10 for connecting one end (proximal end) sides of the upper arm portion 21a and the lower arm portion 21b.

The second lever 22 includes an upper arm portion 22a and a lower arm portion 22b respectively arranged on upper and lower sides of the other half side in the direction of the width of the shoulder belt section 10 and extending in the direction of the width of the shoulder belt section 10, and a connecting portion 22c arranged on a lateral side of the other half side of the shoulder belt section 10 and connecting one end (proximal end) sides of the upper arm portion 22a and the lower arm portion 22b.

The lower arm portions 21b, 22b of the respective levers 21, 22 are shorter than the upper arm portions 21a, 22a respectively in length in the direction of the width of the shoulder belt section 10.

The first and second levers 21, 22 are arranged on the upper surface of the left (or right) shoulder portion of the seatback 3 at different positions in the lateral direction of the seat 1 in such a manner that the distal ends of the upper arm portions 21a, 22a and the distal ends of the lower arm portions 21b, 22b face each other respectively as shown in FIG. 2.

As shown in FIG. 1, the shoulder belt section 10 is drawn from a rear side of the seat 1 to a front side of the seat 1 through the inside of a frame surrounded by the series of upper arm portions 21a, 22b, the connecting portion 22c, the lower arm portions 22b, 21b and the connecting portion 21c. In other words, in this embodiment, the first and second levers 21, 22 also serve as a belt guide for guiding the shoulder belt section 10.

The first and second pivotably supporting portions 23, 24 support the connecting portions 21c, 22c of the respective levers 21, 22 to the seatback 3 respectively so that the first and second levers 21, 22 are capable of rising and rotating in the direction away from each other. In this embodiment, the respective pivotably supporting portions 23, 24 support portions of the respective connecting portions 21c, 22c near the lower ends thereof. However, it is also possible to support upper end portions or midsections of the respective connecting portions 21c, 22c.

The hanging member 25 is formed of linear member such as wire in this embodiment, and both end sides thereof are secured to distal end portions of the lower arm portions 21b, 22b of the respective levers 21, 22. As shown in FIG. 4, the hanging member 25 is adapted to be tensed between the distal end portions of the lower arm portions 21b, 22b when the respective levers 21, 22 rotate upward and the respective lower arm portions 21b, 22b assume respectively an upright posture substantially vertical to the upper surface of the seatback 3. However, the hanging member 25 may slightly sag so as to lie along an outer surface of the inflated shoulder belt section 10.

In this embodiment, when the respective levers 21, 22 (the respective lower arm portions 21b, 22b) are tilted down to the upper surface of the seatback 3 as shown in FIG. 2, the hanging member 25 is in a state of being entered into the inside of the seatback 3. The hanging member 25 is pulled out from the seatback 3 by the lower arm portions 21b, 22b when the respective lower arm portions 21b, 22b are rotated and raised.

A method of storing the hanging member 25 when the respective levers 21, 22 are tilted down to the upper surface of the seatback 3 is arbitrary. For example, it is also possible to provide a slit, a recess, or the like on the upper surface of the seatback 3 and store the hanging member 25 therein and cover the slit or the recess by an outer cover material of the seatback 3. It is also possible to embed the hanging member 25 into a cushion material by insert molding or the like when molding the cushion material of the seatback 3. Alternatively, it is possible to provide the hanging member 25 integrally with the outer cover material of the seatback 3, so that the hanging member 25 is separated from the surrounding outer cover material and tensed between the lower arm portions 21b, 22b when the respective lower arm portions 21b, 22b are rotated and raised.

In the passenger restraining apparatus in this configuration, the shoulder belt section 10 is used in the same manner as a normal seatbelt. As described above, when the shoulder belt section 10 is attached, the push-up device 20 functions as the belt guide. When the inflator 17 is activated in the case in which the vehicle collides or falls on its side, gas is introduced into the shoulder belt section 10, and the shoulder belt section 10 is inflated so as to increase the thickness (diameter) thereof as shown in FIGS. 4 and 5.

In this case, the respective upper arm portions 21a, 22a of the first and second levers 21, 22 arranged on the upper side of the shoulder belt section 10 are pushed upward by the shoulder belt section 10, and the respective levers 21, 22 rotate upward about the respective pivotably supporting portions 23, 24. At this time, as shown in FIGS. 2 to 4, the lower arm portions 21b, 22b of the respective levers 21, 22 arranged on the lower side of the shoulder belt section 10 rise and rotate, and the hanging member 25 is tensed between the lower arm sections 21b, 22b. Consequently, the inflated shoulder belt section 10 is pushed upward by the lower arm portions 21b, 22b and the hanging member 25, and is placed at a high position on the lateral side of the passenger's head.

In this manner, in the passenger restraining apparatus, since the shoulder belt section 10 is pushed upward by the push-up device 20 provided on the upper surface side of the seatback 3, the inflated shoulder belt section 10 can be placed at a high position on the lateral side of the passenger's head without using a high-output inflator.

Since this passenger restraining apparatus is configured to push up the shoulder belt section 10 by rotating the respective levers 21, 22 by an inflating pressure of the shoulder belt section 10 as described above, it is not necessary to provide a power source for pushing up the shoulder belt section 10 separately, so that simplification of the configuration or reduction of manufacturing cost can be achieved.

The above-described embodiment is shown only for illustrative purposes of the invention, and the invention is not limited to the above-described embodiment.

For example, in the above-described embodiment, the hanging member 25 is formed of the linear member such as a wire. However, the hanging member 25 may be formed of members of various mode, such as a band-shaped member or a sheet-type member. For further example, the above described device is shown for illustrative purposes as being used on a passenger vehicle seat. However, the device or apparatus may also be employed on a driver-seat vehicle seat.

Japan Priority Application 2005-278164, filed Sep. 26, 2005 including the specification, drawings, claims and abstract, is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An occupant restraining apparatus comprising:
    an occupant restraining belt to be pulled around a front side of an occupant by a lateral side of the occupant's head and including an inflatable portion at least at a portion arranged on the lateral side of the occupant's head; and
    a push-up device for pushing up the inflatable portion, the push-up device being provided on an upper surface portion of a seatback,
    wherein the push-up device comprises:

a first lever having an upper arm portion and a lower arm portion arranged respectively on an upper side and a lower side on one half side in the direction of the width of the belt and a connecting portion connecting the upper arm portion and the lower arm portion and arranged on a lateral side of the one half side of the belt, a second lever having an upper arm portion and a lower arm portion arranged respectively on an upper side and a lower side on the other half side in the direction of the width of the belt and a connecting portion connecting the upper arm portion and the lower arm portion and arranged on a lateral side of the other half side of the belt, a first pivotably supporting portion for rotatably supporting the connecting portion of the first lever to an upper portion of the seatback, a second pivotably supporting portion for rotatably supporting the connecting portion of the second lever to the upper portion of the seatback, and a hanging member hung across the lower arm portion of the first lever and the lower arm portion of the second lever for being tensed between the lower arm portions and pushing up the belt when the respective levers rotate and the respective lower arm portions rise upward with respect to the respective pivotably supporting portions.

2. The occupant restraining apparatus of claim I, wherein the first lever is configured so that the upper arm portion is longer than the lower arm portion, and the second lever is configured such that the second lever upper arm portion is longer than the second lever lower arm portion.

3. The occupant restraining apparatus of claim 1, wherein the hanging member comprises a wire.

4. The occupant restraining apparatus of claim 1, wherein the hanging member is configured to sag so that the hanging member lies along an outer surface of the inflatable portion.

5. The occupant restraining apparatus of claim 1, wherein when the push up device rotates, the lower arm portions of the first and second levers and the hanging member push up the inflatable portion.

6. The occupant restraining apparatus of claim 5, wherein the push up device is configured to rotate by the inflatable portion inflating and pushing up the upper arm portions of the first and second levers.

7. The occupant restraining apparatus of claim 1, wherein the first and second levers each form a substantially angular C-shape.

8. The occupant restraining apparatus of claim 1, wherein the first and second levers are arranged on an upper surface of a shoulder portion of the seatback such that a distal end of the upper arm portions face each other and distal ends of the lower arm portions face each other.

9. The occupant restraining apparatus of claim 1, wherein when the inflatable portion is in an uninflated state, at least a portion of the hanging member is configured to hang in an inside portion of the seatback.

10. The occupant restraining apparatus of claim 9, wherein when the inflatable portion is in an inflated state, the hanging member is configured to hang outside of the seatback.

11. An occupant restraint device comprising:

a restraint belt with an inflatable portion arranged on a lateral side of an occupant's head; and a push up device to push up the inflatable portion, the push up device is located on an upper surface of a seatback, wherein the push up device is configured so that when the inflatable portion inflates, an upper side of the inflatable portion pushes up and rotates the push up device so that the push up device then pushes up a lower side of the inflatable portion.

12. The occupant restraint device of claim 11, wherein the push up device includes first and second levers, a hanging member, and first and second pivotably supporting portions.

13. The occupant restraint device of claim 12, wherein each lever includes an upper arm portion and a lower arm portion arranged respectively on an upper side and a lower side on one half side in the direction of the width of the belt and a connecting portion connecting the upper arm portion and the lower arm portion and arranged on a lateral side of the one half side of the belt.

14. The occupant restraint device of claim 13, wherein the first and second pivotably supporting portions are configured to rotatably support the connecting portions of the first and second levers, respectively.

15. The occupant restraint device of claim 14, wherein the hanging member is hung across the lower arm portion of the first lever and the lower arm portion of the second lever for being tensed between the lower arm portions and pushing up the belt when the respective levers rotate and the respective lower arm portions rise upward with respect to the respective pivotably supporting portions.

16. The occupant restraint device of claim 15, wherein the first lever is configured such that the upper arm portion is longer than the lower arm portion, and the second lever is configured such that the second lever upper arm portion is longer than the second lever lower arm portion.

17. The occupant restraint device of claim 15, wherein the hanging member comprises a wire.

18. The occupant restraint device of claim 15, wherein the hanging member is configured to sag such that the hanging member lies along an outer surface of the inflatable portion.

19. The occupant restraint device of claim 15, wherein when the push up device rotates, the lower arm portions of the first and second levers and the hanging member push up the inflatable portion.

20. The occupant restraint device of claim 19, wherein the push up device is configured to rotate by the inflatable portion inflating and pushing up the upper arm portions of the first and second levers.

21. The occupant restraint device of claim 15, wherein the first and second levers each form a substantially angular C-shape.

22. The occupant restraint device of claim 15, wherein the first and second levers are arranged on an upper surface of a shoulder portion of the seatback such that a distal end of the upper arm portions face each other and distal ends of the lower arm portions face each other.

23. The occupant restraint device of claim 15, wherein when the inflatable portion is in an uninflated state, at least a portion of the hanging member is configured to hang in an inside portion of the seatback.

24. The occupant restraint device of claim 23, wherein when the inflatable portion is in an inflated state, the hanging member hangs outside of the seatback.

* * * * *